United States Patent [19]

Rabain et al.

[11] Patent Number: 4,578,816

[45] Date of Patent: Mar. 25, 1986

[54] METHOD OF SYNCHRONIZATION OF TRANSMITTER-RECEIVER STATIONS OF A FREQUENCY-JUMPING NETWORK AND A STATION FOR THE PRACTICAL APPLICATION OF SAID METHOD

[75] Inventors: Jacques Rabain; Joseph Swaenepoel, both of Paris, France

[73] Assignee: Thomson-CSF, Paris, France

[21] Appl. No.: 449,214

[22] Filed: Dec. 13, 1982

[30] Foreign Application Priority Data

Dec. 15, 1981 [FR] France ................. 81 23440

[51] Int. Cl.[4] ............................................. H04K 1/00
[52] U.S. Cl. .................................. 455/27; 178/22.17; 375/2.2
[58] Field of Search ............................. 375/1, 2.1, 2.2; 455/27; 178/22.17

[56] References Cited

U.S. PATENT DOCUMENTS

| | | | |
|---|---|---|---|
| 4,145,569 | 3/1979 | Ehrat ................. | 178/22.17 |
| 4,276,652 | 6/1981 | McCalmont et al. ........ | 375/2.1 |
| 4,301,537 | 11/1981 | Roos ..................... | 375/1 |
| 4,355,399 | 10/1982 | Timor ................... | 375/1 |
| 4,383,323 | 5/1983 | Timor II ................ | 375/2.2 |
| 4,392,231 | 7/1983 | Henry ................... | 375/1 |
| 4,479,226 | 10/1984 | Prabhu et al. ........... | 375/2.2 |

FOREIGN PATENT DOCUMENTS 0065636 4/1982 European Pat. Off. ............ 375/2.2
1817118 8/1969 Fed. Rep. of Germany .

OTHER PUBLICATIONS

IEEE National Telecommunications Conference, Dec. 1974, Merkel et al., "Microcomputer Application To a Spread Spectrum Frequency Hopping Modem", pp. 536-542.

Primary Examiner—Salvatore Cangialosi
Attorney, Agent, or Firm—Oblon, Fisher, Spivak, McClelland & Maier

[57] ABSTRACT

The method of synchronization enables a network of transmitter-receiver stations which communicate by frequency-jumping to establish communication links after silent periods of long duration in spite of drift of the clocks with which the transmitter-recivers of the network are equipped. Standby laws $L_i$ having frequency jumps deduced from the traffic law L are applied during the silent periods of the network. These laws progress at a frequency which is lower as the silent period of the network becomes longer. A calling station breaks the silence of the network by transmitting a call sequence ... $\overline{ST}$, $\overline{ST}$, ST, $\overline{ST}$, $\overline{ST}$, ..., under frequency conditions which are determined from its standby law $L_i$ in progress and from the preceding standby law $L_{i-1}$. The stations in the standby state detect in this sequence part of the sequence which coincides with their own standby law and accordingly deduce their relative displacement with respect to the calling station.

6 Claims, 4 Drawing Figures

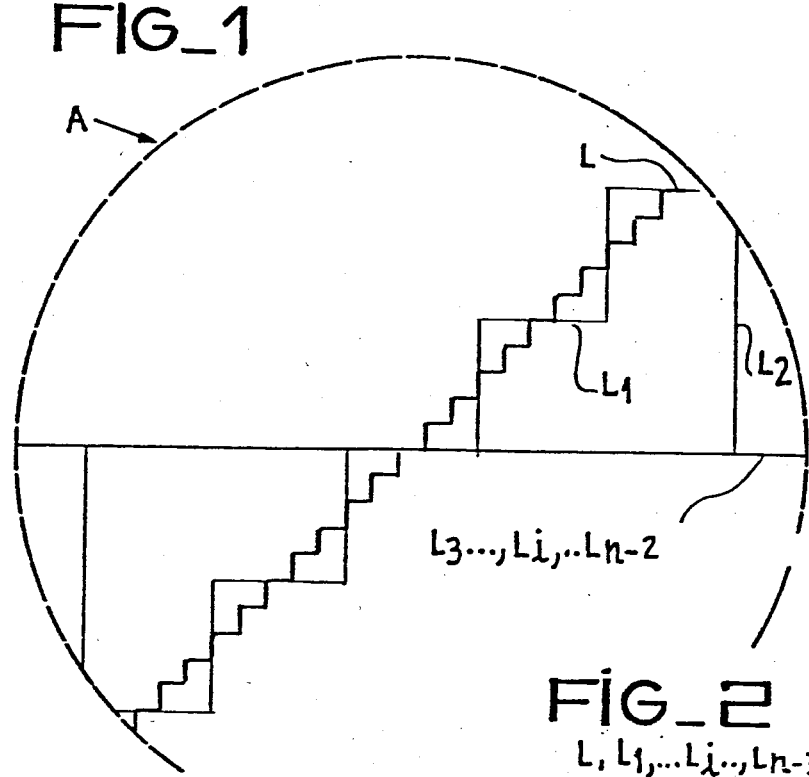
FIG_1
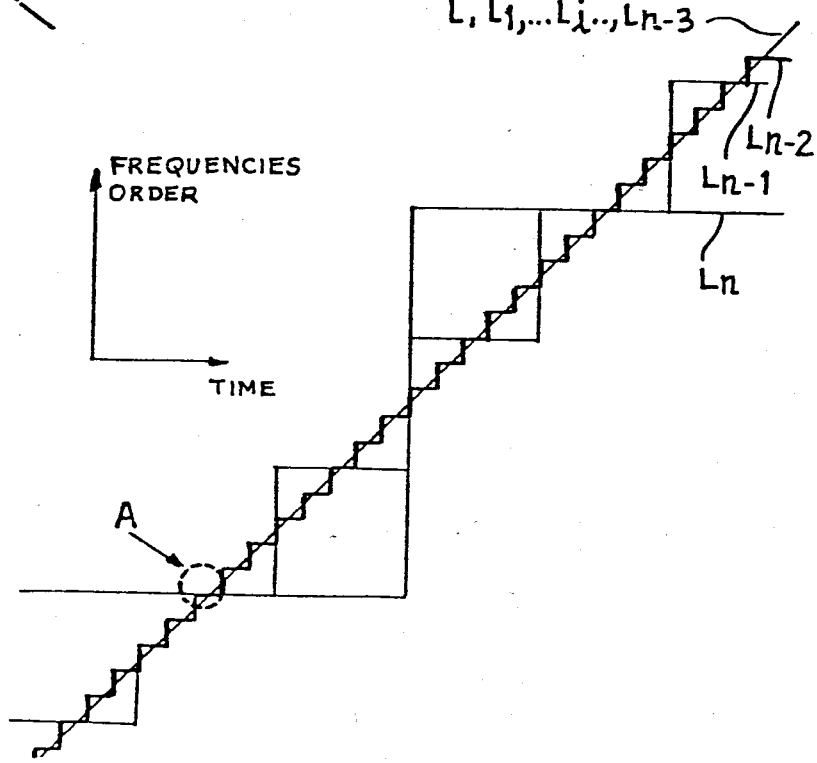
FIG_2

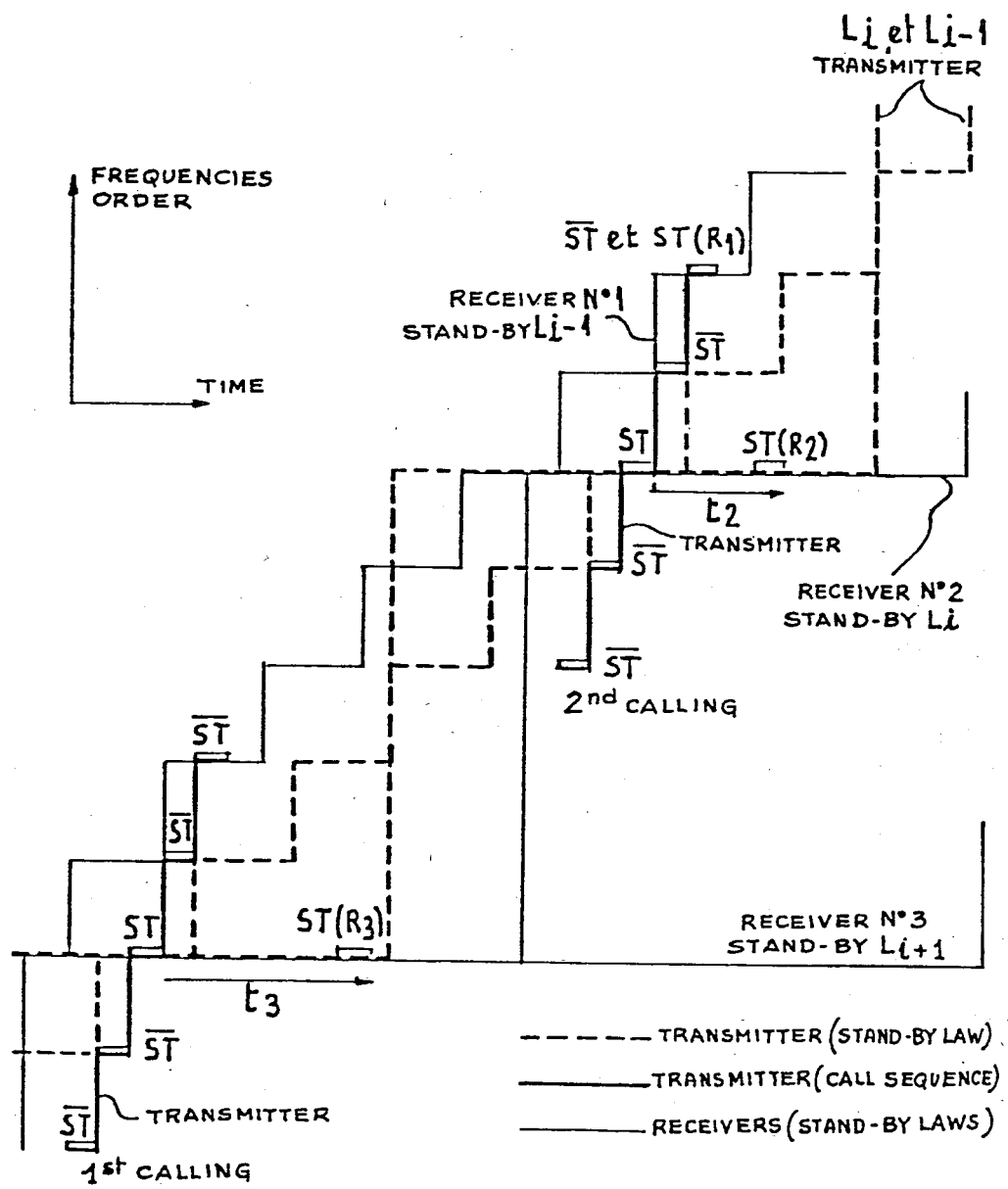

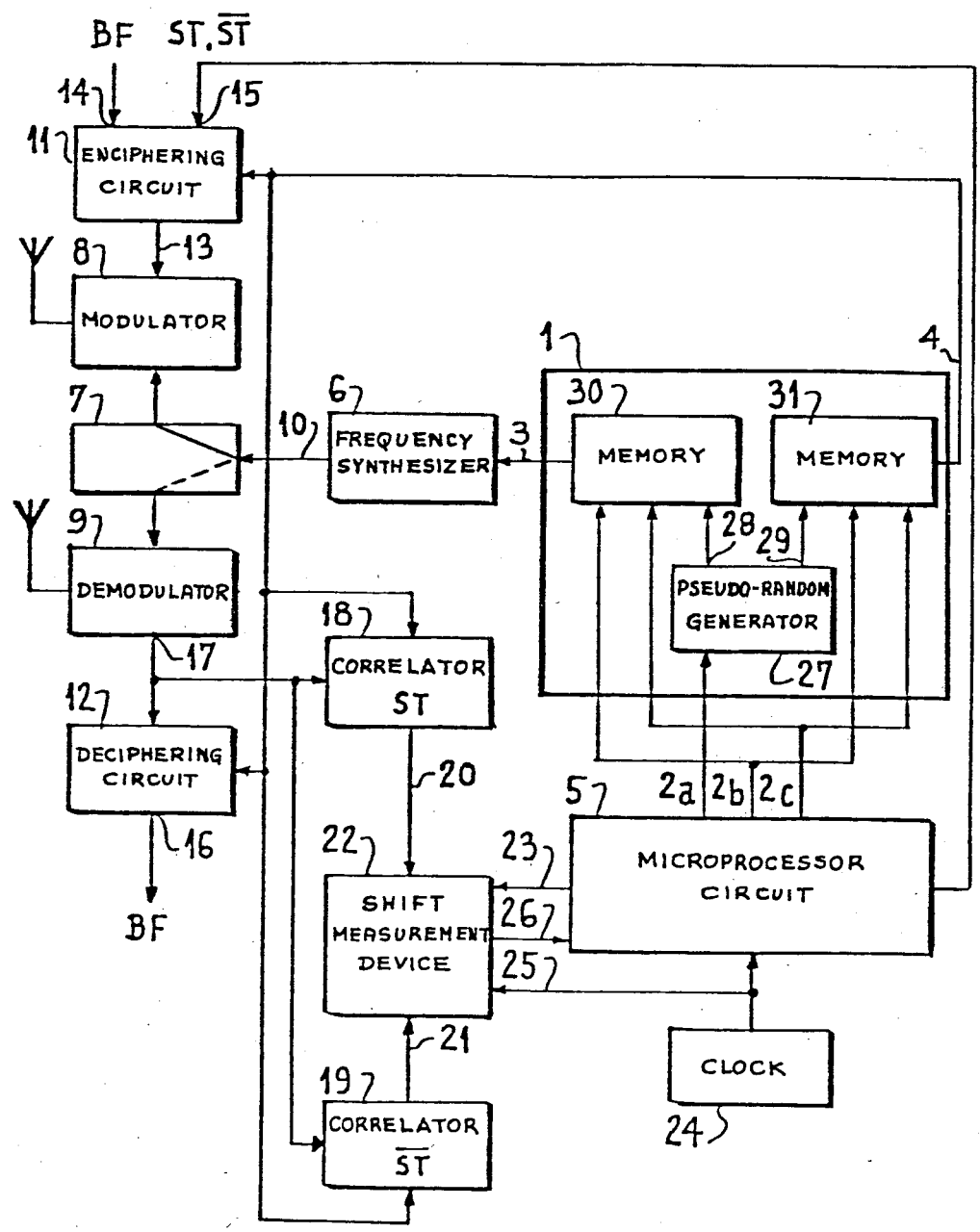
FIG_4

METHOD OF SYNCHRONIZATION OF TRANSMITTER-RECEIVER STATIONS OF A FREQUENCY-JUMPING NETWORK AND A STATION FOR THE PRACTICAL APPLICATION OF SAID METHOD

This invention relates to the synchronization of transmitter-receivers of a frequency-jumping network and to transmitter-receivers for the practical application of the method.

In a network of transmitter-receiver stations operating on carrier frequencies which vary in jumps at a given rate in order to protect the network against interception and jamming by a hostile third party, the carrier frequency which permits communication between the transmitter-receivers of the network must be modified simultaneously in all stations. As a general rule, protection against interception is enhanced by enciphering information to be transmitted and by making a concerted change during utilization of the cipher.

In this mode of transmission known as frequency evasion, the change in frequency and in cipher is made in an identical manner in all stations of the network by means of a device with which each transmitter-receiver is equipped. This device comprises a random-data generator. One series of these data is converted to frequencies, another series is converted to cipher codes. After initialization at the outset, said generator is time-controlled by a clock included in the device and defines for the network a time law or so-called traffic law L which determines at each instant a transmission frequency f and a cipher c which is known to every one. Said transmission frequency and cipher are maintained during an elementary time interval T or stair-step of said traffic law.

In order to ensure satisfactory reception and deciphering of messages, accurate synchronism of the clocks of the different stations must be ensured. If this synchronism can be maintained during transmission of a call by making reference to the logical structure of the ciphered message as described, for example, in either of the two French patent Applications No. 80 07015 or No. 81 00313 in the name of the present Applicant, addition of drift of the clocks of the different stations during the prolonged silent intervals of a network calls for the use of methods which ensure reception of a call and permit synchronization of the clocks of "called" stations with the clock of the "calling" station.

The method in accordance with the invention provides a solution to the problem by establishing rapid communication and maintaining protection against interception by any unauthorized third party.

There is provided in accordance with the invention a method of synchronization of transmitter-receivers of a frequency-jumping network in which the transmitter-receiver stations communicate on carrier frequencies maintained during stair-step intervals of predetermined duration T. These frequencies vary in jumps from one stair-step to the next in accordance with a random traffic law generated by identical means in all the stations, said generating means being associated with local clocks. The method of synchronization is mainly distinguished by the fact that, during a silent period of the network, each station establishes on the basis of the traffic law controlled by its local clock synchronous standby laws $L_i$ having stair-step time intervals which are multiples of the time interval of the stair-step T, $K_iT$ which increase from one law to the next with the duration of the silent period, and which are such that $K_i/K_{i-1}=Q_i$. A further distinctive feature lies in the fact that, in order to establish a communication, a station in the "calling" position transmits a call sequence comprising at least one group of synchronization words ST having a duration T and emitted on carrier frequencies which correspond to the stair-steps of its current standby law $L_i$, said synchronization words being transmitted within a time interval T which is centered with respect to the time-duration $K_iT$ of the stair-step of the current standby law.

The invention is also directed to a transmitter-receiver station for the practical application of the method outlined in the foregoing.

Other features of the invention will become more apparent upon consideration of the following description and accompanying drawings, wherein:

FIGS. 1 and 2 are diagrams illustrating the different frequency-jump laws, the traffic law L and the standby laws $L_1$, $L_2$ ... $L_n$ which are employed in the method;

FIG. 3 is a diagram illustrating the method of synchronization in accordance with the invention;

FIG. 4 is a block diagram of a transmitter-receiver for the practical application of the method.

In the case of a calling station, the method in accordance with the invention consists in transmitting a sequence of synchronization words at predetermined intervals in the internal development of the traffic law L and constituting time-marks. In the case of a station in the standby state in which the traffic law is liable to be displaced with respect to the traffic law of the calling station, the method consists in establishing listening conditions such that the reception of a synchronization word at the same frequency as its emission frequency is always possible and that the time-mark which it represents permits measurement of the displacement in time of the traffic law of the station in the standby state with respect to the same law in the calling station. The measurement just mentioned makes it possible for the station in the standby state to reduce this relative displacement by synchronizing its traffic law with respect to the traffic law of the calling station. When the call sequence has come to an end, the calling station and receiving stations being synchronized, transmission of the message takes place on a frequency which varies in jumps in accordance with the traffic law L which is maintained throughout the duration of the message in the case of all stations.

FIG. 1 illustrates the development of the law L employed during a transmission. This law is represented in the figure by the stair-step diagram in which the step intervals are of the shortest duration equal to the frequency-change period T. The ordinate in this diagram is the order of the corresponding step. Each step therefore has a time-duration representing the elementary time interval T during which is defined a random data item L. This random datum is converted to emission or reception frequency and to a cipher code if necessary. When a communication is established and during standby periods, this law is not employed directly but serves as a basis for establishing respectively the instants of transmission of synchronization word sequences by the calling station and the conditions of listening of the receivers in a standby state. To this end, n low-rate standby laws are established by each station on the basis of its traffic law L and are derived from said traffic law by subsampling and therefore synchronized with this latter. It will be postulated that $L_1, L_2 \ldots L_i \ldots L_n$ represent said standby laws. The lengths of the stair-steps of said laws are respectively $K_1T < K_2T < \ldots < K_iT < \ldots K_nT$ and $K_i = Q_iK_{i-1}$. The frequencies and cipher codes of a law $L_i$ are the frequencies and cipher codes of the law L at intervals of $K_iT$. Said laws are established successively in the different stations progressively as the silent period increases from the time of the last transmission in the network.

It will in fact be postulated that $T_S$ is the duration of a silent period during which, taking into account the stability of the clocks of the different stations, said stations undergo drift to the extent $t < (K_iT/2$, where t is the maximum relative divergence at absolute value between any two stations of the network. if $\Delta F/F$ is the relative accuracy of the control oscillator, $T_S = K_iT/(4\Delta F)/F = T_i$ is the period of maximum silence during which compensation for drift may be obtained from the standby law $L_i$. This period of maximum silence determines the instants at which the station must undergo a transition from a given standby law of immediately higher index. Estimation of this period can vary from one station to another and the stations of the network can have different standby laws at any given instant.

The sequence of synchronization words transmitted by a calling station to other stations of the network permits synchronization of stations of the same network if the standby laws are two successive laws.

This accordingly provides a definition, in the case of the standby state as a function of the duration of the silent period, of a frequency-jumping law $L_v$ which is derived from the law L and constituted by the series of laws $L_1, L_2, \ldots L_i \ldots L_n$. A high value of $K_i$ increases the duration of maximum permissible displacement but reduces the rate of the law $L_v$ and increases the time of putting into communication which therefore increases with the time of silence of the network.

There is shown in FIG. 1 a law $L_1$ for which $K_1 = 5$ and a law $L_2$ for which $K_2 = 15$; the laws $L_3, \ldots L_i, L_n$ appear to be superposed.

FIG. 2 shows the relations between the standby laws having higher indices $L_{n-2}, L_{n-1}$ and $L_n$, the time scale being different in these two figures, with $K_n/K_{n-1} = 3$ and $K_{n-1}/K_{n-2} = 5$.

The method of synchronization in accordance with the invention is illustrated in FIG. 3. A so-called "transmitter" station desires to establish a communication at a given instant. At this instant, the standby law of said transmitter is $L_i$ as shown in dashed lines in the figure, the standby law of immediately lower index $L_{i-1}$ having also been shown in dashed lines. The transmitting station emits a synchronization sequence comprising a synchronization word ST which is transmitted on a stair-step having a time-duration T located at the center of the step of duration $K_iT$ of its standby law at the frequency $F_i$ corresponding to said step and ciphered in the code corresponding to this stair-step. Odd-numbered coefficients $K_i$ are chosen in order to distribute the time-duration of a standby step symmetrically with respect to the transmission steps which have a duration T.

In order to explain all the possible cases, it is assumed in the case of three receivers No. 1, No. 2 and No. 3 that the standby laws at the time of establishment of a communication are as follows: the standby law $L_{i-1}$ in the case of the first receiver has an index immediately below that of the law $L_i$ of the transmitter; the standby law $L_i$ has the same index in the case of the second receiver and the standby law $L_{i+1}$ has an immediately higher index in the case of the third receiver. These standby laws of the receivers are displaced with respect to those of the transmitter by time-intervals corresponding to the drifts.

In the case of the second receiver which is displaced with respect to the transmitter by a time interval of lower value than the maximum drift corresponding to the silent period which determines the standby law $L_i$, the synchronization word ST exitted at the center of the stair-step of the same standby law of the receiver is received on the corresponding stair-step at the same values of frequency and of cipher.

The synchronization word ST received by the receiver under expected conditions of frequency and cipher is demodulated and then appears in the form of a binary signal which is identifiable by means of a digital correlator. The word ST which is enciphered in the expected code is loaded in the reference register of said digital correlator at each start of the stair-steps of the standby laws. The relative displacement or shift between the identification instant of said synchronization word and its position in time at the instant of generation of said word by the receiver at the center of the same shifted stair-step is measured. This measurement is expressed by a number M of steps each having an elementary time-duration T and a remainder R which is counted in number of transmission bits. A shift of R bits of the devices which deliver clock pulses to the random data generator which controls the traffic law L of the receiver restores the coincidence between the transitions of the corresponding law L and those of the traffic law of the calling station. Correction for the number M of stair-steps is performed by means which permit distribution of the random data of the law L in a manner which is either advanced or retarded with respect to the normal progression of the law L. These means are identical with those employed for establishing the standby laws.

The detection and synchronization just mentioned initiate switching of the transmitter to the traffic law L which is maintained throughout the duration of the message. Reception of a word ST therefore produces synchronization of a receiver with the calling station and also constitutes the information which serves to put the receiver under the listening conditions corresponding to the traffic law L for a predetermined length of time. Periodic emission of a word ST during transmission of a message maintains the receiver on this traffic law throughout the duration of transmission. Non-reception of synchronization words ST indicates the end of the message at the receiver which is then placed under listening conditions corresponding to the first standby law $L_1$.

In the case of the third station which is governed by the law $L_{i+1}$ when a communication is established, one emission of the synchronization word ST may not be sufficient to establish synchronization. The receiver detects a word ST under the frequency and cipher conditions of its standby law only at intervals of $K_{i+1}/K_i$ stair-steps. The synchronization word ST must therefore be repeated at least $K_{i+1}/K_i$ times at a rate $K_iT$ in order to guarantee detection of the word ST.

Although the method in accordance with the invention does in fact permit establishment of a communication link between the stations of a network in the majority of instances of cumulative drift during long stationary periods, the method may be found ineffective when limited to the elements described above and when the standby law of the first receiver is still $L_{i-1}$ whereas said transmitter is governed by the law $L_i$ at the instant of transmission of the call.

The transmitter station which follows the law $L_i$ transmits synchronization words during periods corresponding to the half-intervals of the stair-steps of its standby law and the receiver station will not be capable of receiving the transmitted words ST by reason of the shift considered. In order to remedy this possible deficiency at the time of a calling sequence, the words ST transmitted at the center of a stair-step of a standby law of order i are accompanied by a second type of synchronization word $\overline{ST}$. If the ratio of time-duration of the stair-steps between the law $L_{i-1}$ and the law $L_i$ is $Q_i = K_i/K_{i-1}$, $Q_i$-1 words $\overline{ST}$ of duration T and distributed on each side of the emission instants of the words ST are transmitted during the steps of the law $L_i$ with values of frequency and cipher corresponding to the standby steps of the index law which is immediately below but closer in time with respect to the normal progression of said standby law of lower index $L_{i-1}$ in order to cover the stair-step of the standby law $L_i$. Redistribution in time of the frequency and cipher values which are necessary for transmission of the words $\overline{ST}$ is performed by the same means as the establishment of the standby laws. This series of synchronization words ... $\overline{ST}$, $\overline{ST}$, ST, $\overline{ST}$, $\overline{ST}$ ... forms a calling sequence.

At the time of reception, one of the words $\overline{ST}$ is received on a carrier frequency with a cipher code which coincide with those generated locally by the receiver during one of the periods T while following the conditions normally associated with the law $L_{i-1}$. Said word is then demodulated, identified by correlation with the corresponding word $\overline{ST}$ and employed in the same manner as a word ST.

In the case of a receiver, reception of a word $\overline{ST}$ therefore indicates that the transmitter at the moment of transmission followed the standby law of higher index than that of the law which the receiver itself had been following. The conditions of frequency and cipher for which the word $\overline{ST}$ has been correlated identify the word transmitted in the transmission sequence and define the time reference which must be taken into consideration by the receiver in order to correct the cumulative drift.

In the example of FIG. 3 in which the law $L_i$ is then in progress within the transmitter, where $K_i/K_{i-1} = Q_i = 5$, and where $K_{i+1}/K_i = 3$, at least three calling sequences must be emitted by the transmitter (only two of which are illustrated) and each sequence must contain one synchronization word ST transmitted at the center of the stair-step $L_i$ over a time interval T, and $Q_i$-1 = 4 synchronization words $\overline{ST}$ distributed on each side of ST on stair-steps of duration T on carrier frequencies and with cipher codes determined by the law $L_{i-1}$ of the transmitter.

The relative displacements which are measured by the receivers and permit synchronization of the clocks of said receivers are 0, $t_2$ and $t_3$ respectively in the case of the first, second and third receivers in the case of the diagram of FIG. 3, the zero shift corresponding to a difference between the emitted data $\overline{ST}$ and the locally generated data ST, which makes it possible to determine that the call is centered on the law $L_i$ and not on the law $L_{i-1}$. In the last-mentioned case, synchronization is obtained by counting the number of stair-steps of the traffic law L between the central frequency $F_i$ corresponding to the center of the stair-step which is closest to the law $L_i$ and the received frequency.

FIG. 4 is a block diagram showing a transmitter-receiver for the practical application of the method of synchronization in accordance with the invention. For transmission purposes, said transmitter-receiver has a low-frequency signal input 14 connected to the signal input of an enciphering circuit 11, the output 13 of which delivers the enciphered low-frequency signal to the signal input of a modulator 8. Said modulator receives on its second input the carrier signal at the transmission frequency of a transmission-reception switch 7, the output of said modulator being connected to a transmission antenna.

Similarly, the device is provided for reception purposes with a receiving antenna connected to the input of a demodulator 9 having a carrier signal input connected to the second output of the switch 7, the output 17 of said demodulator being connected to the ciphered signal input of a deciphering circuit 12, the output 16 of which delivers the low-frequency signal in clear.

The transmitter-receiver further comprises a random-data generating device 1. A series of said data which are available at its output 3 is transmitted to a frequency synthesizer 6 and this latter converts said data to random frequencies which are available at its output 10. Said frequencies are transmitted via the transmission-reception switch 7 either to the modulator 8 or to the demodulator 9 according as the station is in the transmission position, in the standby position, or in the reception position. A second series of data is available at the output 4 of the data generator. This series determines the cipher values associated with the frequency values. Distribution of the random data in time on the outputs 3 and 4 of the device for establishing the traffic and standby laws is carried out by a microprocessor management circuit 5 which is connected to the generator device 1 by means of a multiple connection 2 (2a, 2b, 2c). The internal structure of said generator and its functional relations with the management unit will be described hereinafter. The cipher data are transmitted to the enciphering circuit 11 and to the deciphering circuit 12. For the purpose of detecting the synchronization sequences transmitted by a station in the transmitting position, each station is further provided with a correlator 18 for words ST and with a correlator 19 for words $\overline{ST}$, the signal inputs of which are connected to the output of the demodulator 9. Said correlators are further provided with cipher inputs connected to the cipher output 4 of the random data generator. This makes it possible for the correlators to encipher the words ST or $\overline{ST}$ which are stored respectively in reference registers of said correlators. The outputs 20 and 21 of the correlators deliver a clock pulse when a word ST or $\overline{ST}$ appears and said pulse provides a time-mark which indicates the instant of reception of said word.

Said clock pulse is transmitted to an input of a shift measurement device 22. Said device receives locally generated clock pulses from the management device via the connection 23. Said clock pulses indicate the positions of the words ST in time as the internal progression of the standby laws takes place. Measurement of the shift consists in measuring the interval of time between a locally generated clock pulse and the pulse derived from one of the correlators. The first clock pulse which is present initiates operation of a pulse counter at the frequency of the transmission bits, said pulses being delivered by a local clock 24 and applied to the input 25 of the shift measurement device. The second clock pulse which is present stops the counter, the contents of which accordingly indicate the measurement of shift. Said contents correspond to a time-lag of the receiver with respect to the transmitter if the clock pulse derived from a correlator initiates operation of the counter. Said contents correspond to a time-lead if the locally generated clock pulse initiates operation of the counter. The end of the standby stair-step has the effect of resetting the timing counter to zero. If said zero-reset takes place before a clock pulse derived from a correlator initiates stopping of the counter, no error information is transmitted and the standby state is maintained. The resetting information which is dependent on reception of a word ST or a word $\overline{ST}$ also indicates reception of a call and constitutes in the case of the management circuit the information relating to transition to the traffic law for a predetermined period of time. Reception of a word ST during a message results in a zero-value resetting information which nevertheless reinitializes the period of maintenance of the traffic law.

The clock oscillator 24 is also connected to the management circuit 5 and also controls the progress of the program of its microprocessor. Said management circuit further comprises a divider counter through which clock pulses are produced from the oscillator at the period T which determines transitions of the traffic law. Said circuit comprises a silent-period counter which determines the instants of transition from a law having a given index to a law having an immediately higher index. The microprocessor is programmed so as to control the stages of performance of the method of synchronization described in the foregoing.

The random-data generating device 1 comprises a pseudorandom generator 27, one clock input of which is connected to the clock output 2a of the management circuit 5. This generator 27 has two data outputs 28 and 29 connected to memories 30 and 31 each comprising $K_n$ memory registers to which are assigned addresses numbered from 0 to $K_n$. These memories are connected to the management circuit by means of a write-addressing connection 2b which receives a signal having a period T and by means of a read connection 2c. The outputs of these memories are the outputs 3 and 4 of the generator 1. The triggering clock pulses applied to the clock input 2a initiate step-by-step advance of the internal pseudorandom generator 27. The data available on the connections 28 and 29 are stored respectively in the memories 30 and 31 at an address which is incremented by one unit at each triggering pulse delivered by the connection 2b. The address $A_m$ is transmitted after a clock pulse H and the address $A_{m+1}$ is transmitted after the clock pulse (H+1).

A fresh datum introduced into the register at one address will erase the datum stored during the preceding cycle at the same address. In these memories, the $K_n$ last data of two random series which are intended to establish the frequency and cipher values are thus available. Programmed read addressing of the memory registers makes it possible to obtain random data on outputs 3 and 4 of the device. Said random data are distributed in the time required to establish the different traffic and standby laws of the method in accordance with the invention.

There corresponds to each elementary time interval T of a stair-step a reading of the random data stored in the memories at a given address as triggered by a clock pulse H. By way of example, by limiting the number of standby laws to 2, $L_1$ and $L_2$ with a number $K_1$ equal to 3 in the case of $L_1$, and $K_2=3\times 5=15$ in the case of $L_2$, the memories 30 and 31 must have 15 registers.

The random data are written in these registers at the rate T at the successive addresses $A_m$, m=1 to 15.

In order to establish the traffic law L, these registers are read successively at the rate T with a time-lag with respect to writing which is equal to a period T, a given address register being always read first in the case of a cycle which involves reading of memories having a time-duration $K_nT$.

When establishing successive standby laws in order to ensure that the changes of laws are always synchronous, the cycle of reading of the memory corresponding to the law $L_i$ in progress is completed and the following standby law is established only at the time of the following memory reading cycle.

In order to establish the first standby law $L_1$, reading of each address register $A_m$ is repeated during $K_1$ periods T and the following read register has the address $(A_m+K_1)$ (modulo $K_n$) with again the same initial address read for each reading cycle having a duration $K_nT$.

Similarly, for establishment of a standby law $L_i$, reading of each address register $A_m$ is repeated during $K_i$ periods T and the following read register has the address $(A_m+K_i)$ (modulo $K_n$), always with the same initial read address in the case of each reading cycle.

The same register is always read in the case of the law $L_n$.

In the case of a calling station for which the standby law in progress is $L_i$, the establishment of the calling sequence described in the foregoing is obtained by reading at the rate T the data contained in the $Q_i$ address registers ... $A_m$- $2K_{i-1}$, $A_m$- $K_{i-1}$, $A_m$, $A_m+K_{i-1}$, $A_m+$-$2K_{i-1}$, ...

The $(Q_i-1)/2$ first data and the $(Q_i-1)/2$ last data derived from the memories 30 and 31 are the values of frequencies and the values of ciphers employed for transmission of the synchronization words $\overline{ST}$. The data read at the address $A_m$ in the two memories are respectively the frequency value and the cipher value employed for transmission of the synchronization word ST. This sequence is repeated by reading of the address registers which are shifted by $K_i$ with respect to the addresses of the first calling sequence, this being carried out at least $Q_{i+1}=K_{i+1}/K_i$ times in order to ensure that synchronization of the receivers is possible in all cases in which the standby laws of the stations do not differ by more than one law.

Programmed reading of the memories also permits the management circuit to correct a displacement by M elementary stair-steps having a duration T as detected by reception of a word ST or $\overline{ST}$. In regard to reading of the registers, a displacement by M elementary steps having a duration of plus or minus T in the sequences in progress restores the synchronism. In regard to resetting of the step-by-step advance of the pseudorandom generator 27, a burst of M trigger pulses in the event of a time-lag of the writing address accompanied by synchronous acceleration at the rate of said pulse burst restores the coincidence. In the event of a time-lead, the trigger pulses are suppressed as well as the read addressing advance during M stair-steps having a duration T.

What is claimed is:

1. A method of synchronization of transmitter-receiver stations of a frequency-jumping network, comprising the steps of:

generating by identical means associated with local clocks in each of the stations carrier frequencies which are constant during time intervals of predetermined duration T wherein said frequencies are varied in jumps from one interval to the next in accordance with the output of a psuedo-random generator means;

generating, during silent periods of the network, on each of said stations reception frequencies which are constant during time intervals of duration $K_iT$ which vary in jumps from one interval to the next in accordance with a series of successive time signals $L_1, \ldots, L_i, \ldots L_n$, which are derived from said output of said generator means such that the duration $K_iT$ corresponding to time signal $L_i$ is a multiple of T and increased from one time signal $L_{i-1}$ to the next $L_i$ in a ratio $K_i/K_{i-1}=Q_i$ wherein the time signal of each station is changed from one particular time signal to the next as the duration of said silent periods increases; and transmitting from a station in the calling position a call sequence which sequence includes at least one group of synchronization words ST, each word having a duration T and being emitted on carrier frequencies which correspond to the time signal $L_i$ in progress in said station in the calling position wherein said synchronization words ST are transmitted within a time interval T which is centered with respect to the timed-duration $K_iT$ of the time interval of the time signal in progress.

2. A method according to claim 1, wherein estimation of the silent period which is determined from the local clock of each station and may vary from one station to another and the time signals at any given instant being liable to have indices i which differ by one unit at a maximum in the succession of time signals and wherein the call sequence further comprises $Q_{i-1}$ synchronization words of a second type ST having a time-duration T, on each side of the words of the first type and transmitted on carrier frequencies corresponding to the time interval of the preceding time signal $L_{i-1}$ on each side of the time interval which determines the transmission frequency of the word ST of the first type.

3. A method according to claim 1 or claim 2 wherein, when the transmitted messages are ciphered, the cipher values vary at the same time as the frequencies with respect to said output of said generator means and said successive time signals.

4. A method according to claim 1, wherein each station of the network other than the calling station predetermines the displacement in time between its time signal in progress and the time signal of the calling station on the basis of the information detected in the call sequence of the calling station and compensates for said displacement by shifting the output of said generator means associated with said station by a time interval equal to the predetermined displacement so as to ensure that said generator means output coincides with that of the calling station.

5. A method according to claim 4, wherein the traffic-law shift of a particular station also controls the transition of said station to said generator means output which has thus been synchronized.

6. A transmitter-receiver station for the practical application of the method of synchronization according to claim 1, comprising means whereby said output of said generator means and the successive time signals deduced therefrom are generated from a local clock, means for detecting the synchronization words, and a device for measuring the relative displacement between the instant of detection of a synchronization word transmitted by calling station and the instant at which said word would have been generated locally, the means for generating said generator means output being controlled at the time of detection of a shift in order to displace the generator means output of said station to the extent of said measured relative displacement.

* * * * *